United States Patent
Chen

(10) Patent No.: US 7,500,113 B2
(45) Date of Patent: Mar. 3, 2009

(54) SHARE CIRCUIT FOR NORMAL ELECTRICAL POWER

(75) Inventor: Michael Chen, Taipei Hsien (TW)

(73) Assignee: Topower Computer Industrial Co., Ltd., Xindian, Taipei Hsien (TW)

( * ) Notice: Subject to any disclaimer, the term of this patent is extended or adjusted under 35 U.S.C. 154(b) by 638 days.

(21) Appl. No.: 11/049,741

(22) Filed: Feb. 4, 2005

(65) Prior Publication Data

US 2006/0179331 A1 Aug. 10, 2006

(51) Int. Cl.
*G06F 1/00* (2006.01)
(52) U.S. Cl. .................................. 713/300
(58) Field of Classification Search .............. 713/3
See application file for complete search history.

(56) References Cited

U.S. PATENT DOCUMENTS

| 3,697,860 | A | * | 10/1972 | Baker | 323/271 |
| 5,227,666 | A | * | 7/1993 | Asprey | 307/44 |
| 6,141,231 | A | * | 10/2000 | Brkovic | 363/72 |
| 6,768,224 | B2 | | 7/2004 | Shen et al. | 307/64 |
| 7,076,670 | B1 | * | 7/2006 | Krause et al. | 713/300 |
| 2003/0020999 | A1 | * | 1/2003 | Tsujimura et al. | 359/245 |
| 2003/0110403 | A1 | * | 6/2003 | Crutchfield et al. | 713/300 |
| 2004/0061977 | A1 | * | 4/2004 | Freitag et al. | 360/314 |
| 2005/0068016 | A1 | * | 3/2005 | Hung | 323/282 |

OTHER PUBLICATIONS

ATX/ATX12V Power Supply Design Guide, version 1.2, 2000, pp. 1-35.

* cited by examiner

*Primary Examiner*—Chun Cao
(74) *Attorney, Agent, or Firm*—Muncy, Geissler, Olds & Lowe, PLLC

(57) ABSTRACT

An improved share circuit for normal electrical power which is used in a normal electrical power system of a power supply of a computer. The normal electrical power system has a direct current output circuit to provide initial power for starting the computer and the direct current output circuit has a share circuit including a switch line which can be selected to a state of supplying power and a normal circuit for power output for maintaining the computer to start at a normal condition. The switch line is electrically coupling to a load having an external switch and users can control the external switch to a close-circuit state when the computer is at a shut down condition, so as to generate electricity to drive the load, when the external switch is at an open-circuit state. The direct current output circuit will cease electricity output and stop actuating the load.

6 Claims, 2 Drawing Sheets

SHARE CIRCUIT FOR NORMAL ELECTRICAL POWER

FIELD OF THE INVENTION

The present invention relates to an improved share circuit for normal electrical power and, more particularly, to a normal electrical power system of a power supple that can be fully utilized, apart from providing normal electricity output for starting operation, the normal electrical power system can also share the circuit to actuate an additional device such as a fan, a LED decoration lamp or a night light.

BACKGROUND OF THE INVENTION

Power source of computers—the power supply is always the most important factor regarding the quality of the computer to be stable or not. Those engaged in the power supply correlated design manufacture and even common users are quite clear that the electrical power system of the existing power supply is differentiated into a host electrical power system and a normal electrical power system. The host electrical power system refers to the power supply, after a computer is switched on, used to transform alternating current to direct current output to provide the appropriate amount of driving power needed by the computer and its auxiliary devices. While the normal electrical power system is used when the computer is switched off, the power supply still transforms alternating current to direct current in order to provide lower power output with low voltage and low electric current for electrically coupling to a remote ON/OFF as well as those devices used to start the computer such as the motherboard inside the computer.

The comprehensive survey shows that computer is already universalized and there is even more than one computer in a general family. But limits to the hasten narrow space in modern living environment, most users have to put their computers in their bedroom. Although the normal electrical power system continues to operate and generate electricity, according to the user, electricity certainly will not have any utilization apart from providing power for the next start of the computer. The electricity provided by the normal electrical power system is then wasted. Since modern people are more and more fastidious in interior design, therefore, the appearance of the computer will always be decorated with an additional LED decoration lamp. But when the computer is shut down, those beautiful decorations have to be eliminated too, and thus reduce its overall economic efficiency.

SUMMARY OF THE INVENTION

It is a primary object of the present invention to allow users to still fully share the electricity, provided by the normal electrical power system when the computer is shut down, to a load which can be actuated by low voltage, low electric current and under low power environment, such load can be a LED decoration lamp, a fan for heat dissipation or a night light providing illumination at night, so as to maximize the benefit from the normal electrical power system of the power supply.

In order to achieve the foregoing objects, the present invention provides a direct current output circuit of the power supply having a share circuit including a switch line that can be selected to a state of supplying power, and a normal circuit for power output for maintaining the computer to start at a normal condition. And the switch line is electrically coupling to a load having an external switch. When the computer is at a shut down condition, users can control the external switch to a close-circuit state in order to generate electricity to drive the load. When the external switch is in an open-circuit state, the electricity output will be ceased and stop driving the load, so that the normal electrical power system will have an additional valuable function.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
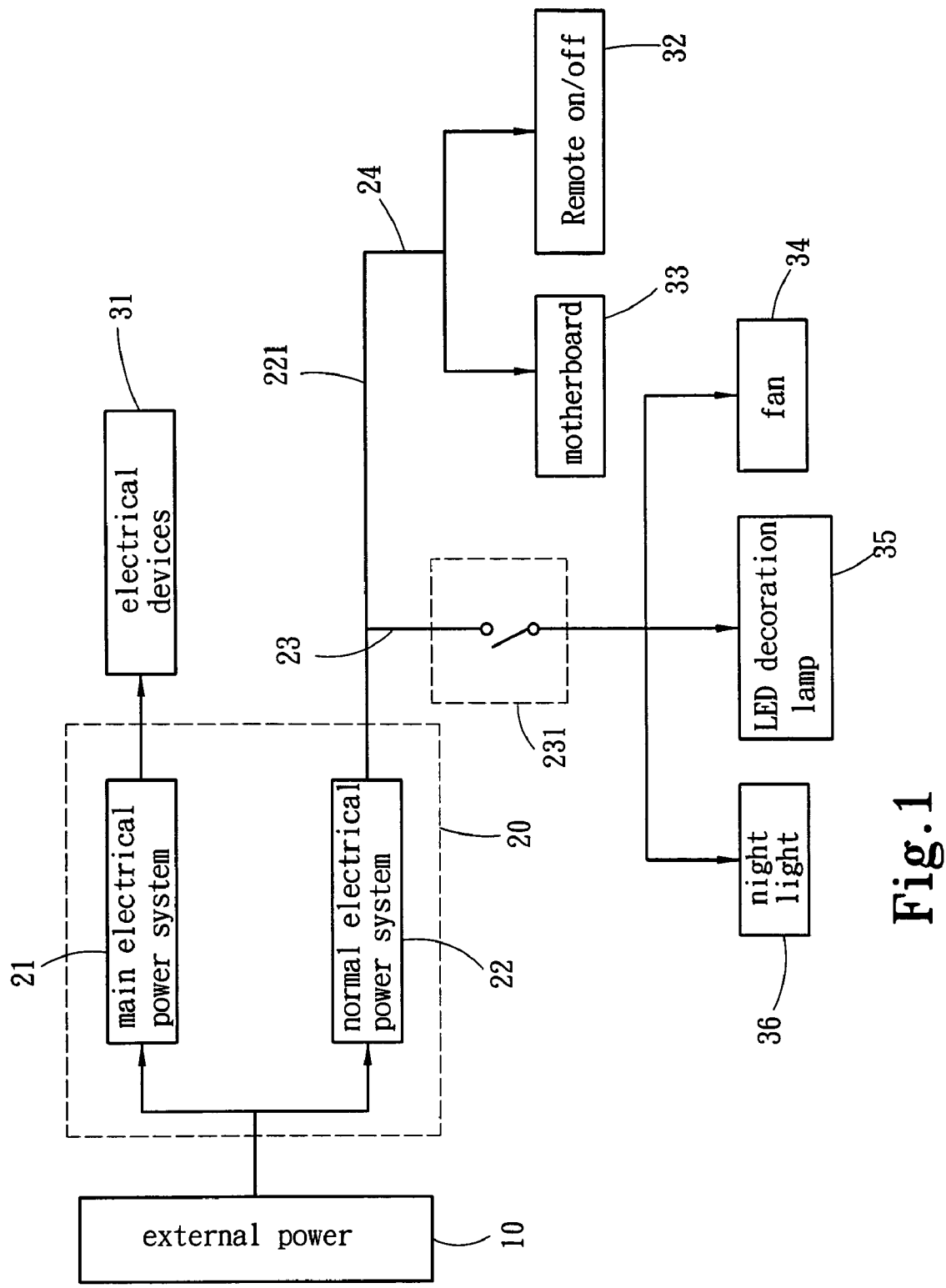
FIG. 1 is a circuit block diagram of the invention.
Figure 2:
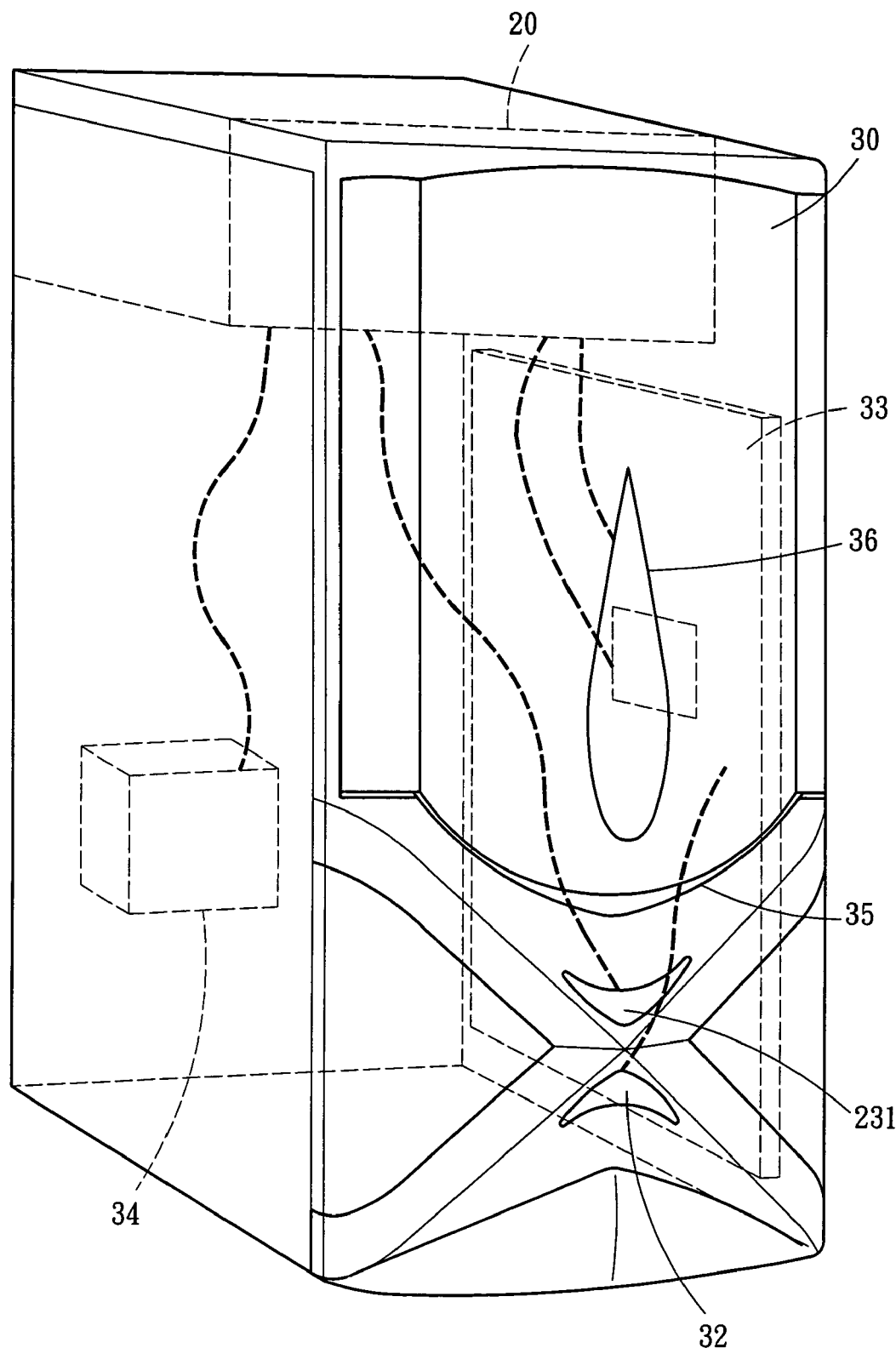
FIG. 2 is a diagram showing the disposition of the mechanism.

Referring to FIGS. 1 and 2, which show the circuit block diagram and the disposition of the mechanism of the invention. The present invention is used in a power supply 20 inside a computer 30. The power supply 20 converts alternating current AC from an external power 10 (main electricity for example) into direct current DC output, wherein the power supply 20 comprises a main electrical power system 21 and a normal electrical power system 22. The main electrical power system 21 provides driving power for electrical devices 31 of the computer 30 such as hard disk, CD-ROM, motherboard 33 and central processing unit, when the computer 30 is at a starting state. While the normal electrical power system 22 has a direct current output circuit 221 to provide initial power for starting the computer 30. (The main electrical power system 21 and the normal electrical power system 22 of the power supply 20 having electricity conversion techniques such as rectifying, filtering and transforming alternating current are all conventional technology, those will not be described in this invention.)

The present invention is about the direct current output circuit 221 of the normal electrical power system 22 having a share circuit including a switch line 23 which can be selected to a state of supplying power, and a normal circuit 24 for power output for maintaining the computer 30 to start at a normal condition. The normal circuit 24 provides driving power to those devices used to complete the initial starting state of computer 30 such as a motherboard 33 and a remote ON/OFF 32. And the switch line 23 is electrically coupling to a load having an external switch 231, the external switch 231 is located at the case of the power supply 20 or the case of the computer 30. The load can be a fan 34, a LED decoration lamp 35 or a night light 36 that provides illumination at night. When the user changes the external switch 231 to a close-circuit state as the computer 30 is at a shut down condition, the direct current output circuit 221 of the normal electrical power system 22 is connected to generate electricity to drive the load. If the user changes the external switch 231 to an open-circuit state, the direct current output circuit 221 will cease electricity output and stop actuating the load.

According to the present invention, the user can sufficiently and effectively use the electricity provided by the power supply 20 that is still having direct current output when the computer 30 is at a shut down condition. Referring to FIG. 2 of the present invention, if the user puts their computer 30 in a rather close environment, when the computer 30 is switched off and the remaining heat is not dispersed, the user can manually change the external switch 231 causing the switch line 23 to be connected, the fan 34 will then start to work for the purpose of heat dissipation. Users can also change the external switch 231 of the present invention at night in order to switch on a night light 36 for illumination without having any other additional illuminating design.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An improved share circuit for normal electrical power, which is used in a normal electrical power system of a power supply of a computer, said normal electrical power system having a direct current output circuit to provide initial power for starting said computer, characterized in:

said direct current output circuit having a share circuit including a switch line which can be selected to a state of supplying power, and a normal circuit for power output for maintaining said computer to start at a normal condition, said switch line is electrically coupling to a load having an external switch, when said external switch is at a close-circuit state, while the computer is in power off state, electricity is generated to drive said load, when said external switch is at an open-circuit state, electricity output ceases and stops driving said load, wherein said normal circuit is providing power to the computer when the external switch is at same close-circuit state.

2. The improved share circuit for normal electrical power according to claim 1, wherein the external switch is located at the case of the power supply.

3. The improved share circuit for normal electrical power according to claim 1, wherein the external switch is located at the case of the computer.

4. The improved share circuit for normal electrical power according to claim 1, wherein the load is a LED decoration lamp.

5. The improved share circuit for normal electrical power according to claim 1, wherein the load is a night light.

6. The improved share circuit for normal electrical power according to claim 1, wherein the load is a fan.

* * * * *